United States Patent
Altevogt et al.

(10) Patent No.: US 10,528,354 B2
(45) Date of Patent: *Jan. 7, 2020

(54) PERFORMANCE-AWARE INSTRUCTION SCHEDULING

(71) Applicant: International Business Machines Corporation, Armonk, NY (US)

(72) Inventors: Peter Altevogt, Boeblingen (DE); Cedric Lichtenau, Boeblingen (DE); Thomas Pflueger, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 15/065,913

(22) Filed: Mar. 10, 2016

(65) Prior Publication Data

US 2017/0161078 A1 Jun. 8, 2017

Related U.S. Application Data

(63) Continuation of application No. 14/956,467, filed on Dec. 2, 2015, now Pat. No. 10,303,481.

(51) Int. Cl.
*G06F 9/30* (2018.01)
*G06F 9/38* (2018.01)
(Continued)

(52) U.S. Cl.
CPC .......... *G06F 9/3838* (2013.01); *G06F 9/3016* (2013.01); *G06F 9/3818* (2013.01);
(Continued)

(58) Field of Classification Search
CPC .... G06F 9/3624; G06F 9/3826; G06F 9/3828; G06F 9/3838; G06F 9/3016; G06F 9/3836

See application file for complete search history.

(56) References Cited

U.S. PATENT DOCUMENTS 4,891,753 A * 1/1990 Budde ................... G06F 9/3836
712/217
5,699,537 A 12/1997 Sharangpani et al.
(Continued)

FOREIGN PATENT DOCUMENTS

JP 2017102919 A 6/2017

OTHER PUBLICATIONS

A. Aggarwal, "Single FU Bypass Networks for High Clock Rate Superscalar Processors", Springer-Verlag, 2004.*
(Continued)

*Primary Examiner* — Benjamin P Geib
(74) *Attorney, Agent, or Firm* — Cantor Colburn LLP; William Kinnaman

(57) ABSTRACT

A processor with multiple execution units for instruction processing is provided. The processor comprises an instruction decode and issue logic and a control logic for resolving register access conflicts between subsequent instructions and a dependency cache, which comprises a receiving logic for receiving an execution unit indicator indicative of the execution unit the instruction is planned to be executed on, a storing logic responsive to the receiving logic for storing the received execution unit indicator, and a retrieving logic responsive to a request from the instruction decode and issue logic for providing the stored execution unit indicator for an instruction. The instruction decode and issue logic is adapted for requesting execution unit indicator for an instruction from the dependency cache and to assign the instruction to one respective of the execution units dependent on the execution unit indicator received from the dependency cache.

6 Claims, 7 Drawing Sheets

(51) Int. Cl.
*G06F 12/08* (2016.01)
*G06F 12/0875* (2016.01)
*G06F 12/0844* (2016.01)

(52) U.S. Cl.
CPC ........ *G06F 9/3867* (2013.01); *G06F 12/0844* (2013.01); *G06F 12/0875* (2013.01); *G06F 2212/1008* (2013.01); *G06F 2212/1032* (2013.01); *G06F 2212/452* (2013.01)

(56) References Cited

U.S. PATENT DOCUMENTS

| | | |
|---|---|---|
| 5,802,386 A | 9/1998 | Kahle et al. |
| 5,835,745 A | 11/1998 | Sager et al. |
| 5,884,060 A | 3/1999 | Vegesna et al. |
| 7,705,647 B2 | 4/2010 | Dai et al. |
| 7,839,194 B2 | 11/2010 | Chang et al. |
| 8,018,261 B2 | 9/2011 | Becker et al. |
| 8,364,936 B2 | 1/2013 | Beaumont-Smith et al. |
| 8,513,997 B2 | 8/2013 | Hesen et al. |
| 8,570,084 B2 | 10/2013 | Lin |
| 8,612,957 B2 | 12/2013 | Guo et al. |
| 8,803,576 B2 | 8/2014 | Kitagawa |
| 9,048,823 B2 | 6/2015 | Bui et al. |
| 9,413,347 B1 | 8/2016 | Nien |
| 10,303,481 B2 | 5/2019 | Altevogt et al. |
| 2002/0004895 A1 | 1/2002 | Corwin et al. |
| 2002/0087833 A1 | 7/2002 | Burns et al. |
| 2003/0126408 A1 | 7/2003 | Vajapeyam et al. |
| 2010/0250900 A1 | 9/2010 | Brown et al. |
| 2010/0325394 A1 | 12/2010 | Golla et al. |
| 2013/0063191 A1 | 3/2013 | Patil et al. |
| 2013/0297912 A1 | 11/2013 | Tran et al. |
| 2013/0346729 A1 | 12/2013 | Barowski et al. |
| 2015/0100965 A1 | 4/2015 | Tran |
| 2015/0200655 A1 | 7/2015 | Kang et al. |
| 2016/0094205 A1 | 3/2016 | Aremallapur |
| 2016/0378483 A1 | 12/2016 | Burger et al. |
| 2017/0033746 A1 | 2/2017 | Lam et al. |
| 2017/0040986 A1 | 2/2017 | Ma |
| 2017/0093386 A1 | 3/2017 | Kitagawa |
| 2019/0095213 A1 | 3/2019 | Altevogt et al. |
| 2019/0095214 A1 | 3/2019 | Altevogt et al. |

OTHER PUBLICATIONS

Kim et al., "Reducing Operand Communication Overhead using Instruction Clustering for Multimedia Applications", IEEE, 2005.*
Stark et al., "On Pipelining Dynamic Instruction Scheduling Logic", 2000, IEEE. (Year: 2000).*
David Patterson and John Hennessy, "Computer Architecture: A Quantitative Approach", Second Edition, 1996. (Year: 1996).*
List of IBM Patents or Patent Applications Treated as Relaed; (Appendix P), Date Filed Mar. 14, 2016, 2 pages.
U.S. Appl. No. 14/956,467, filed Dec. 2, 2015; Entitled: Performace-Aware Instruction Schedulig.
Boghrati et al, "A 800 MGz-1.1 GHz 1.2mW Delay Locked Loop with a Closed Loop Duty Cycle Corrector", Jounral of Electrical and Electronic Systems, vol. 5, Issue 2, 2016, 3 pages, DOI. 10.4172/2332-0796.1000179.
Chung et al, "A Wide-Range All-Digital Duty-Cycle Corrector With Output Clock Phase Alignment in 65NM CMOS Technology", IEICE 2011, pp. 1245-1251, IEICE Electronics Express, Department of Computer Science & Information Engineering, National Chung-Cheng University, Taiwan.
Gran et al., "An Enhancement for a Scheduling Logic Pipelined over two Cycles", Albacete, XVII Jornadas De Paralelismo, Sep. 2006, p. 1-6.
Hennessy et al, "Computer Architecture, A Quantitative Approach", Fourth Edition, 2007, 705 pages.
List of IBM Patents or Patent Applictions Treated as Related; (Appendix P), Date Filed Jul. 26, 2019, 2 pages.
Nagarajan et al, "Instruction Scheduling for Emerging Communication-Exposed Architectures", PDLI, Jun. 2003, 11 pages, Copyright 2003 ACM, San Diego, CA.
Nam, An All-Digital CMOS Duty Cycle Correction Circuit with a Duty-Cycle Correction Range of 15-85% for Multi-Phase Applications, IECE Transactions on Electronics, vol. E88-C, No. 4, Apr. 2005, pp. 773-777.

* cited by examiner

PERFORMANCE-AWARE INSTRUCTION SCHEDULING

DOMESTIC PRIORITY

This application is a continuation of the legally related U.S. application Ser. No. 14/956,467 filed Dec. 2, 2015, which is fully incorporated herein by reference.

BACKGROUND

The invention relates generally to a processor, and more specifically, to a processor with multiple execution units for instruction processing, an instruction decode and issue logic for assigning instructions for execution to one of the execution units. The invention relates further to a method for instruction processing with a processor and a design structure.

Today, processors, e.g. superscalar processors, allow parallel execution of several instructions during a single processor cycle due to the availability of a plurality of parallel execution units in a superscalar processor. Generally, this mechanism increases the processor's performance. It may also be possible to issue multiple instructions to parallel execution pipelines in the same cycle. However, two consecutive instructions may be dependent on each other. I.e., a following instruction may require the result of the preceding instruction. Thus, a scheduling or dispatching of the following instruction has to wait for the preceding instruction to finish. Independent of this, an issuing of instructions to different execution units may be performed without reflecting special dependencies.

Traditional methods try to maximize the distance between dependent instructions: firstly algorithms and programs may be redesigned to best fit the underlying hardware. However, this may be very expensive and must be redone for each processor architecture the software should be executed on. Additionally, the source code may not always be available anymore or a user is not willing to recompile and recertify his system due to the associated costs. In a virtualized environment—using virtual machines (VM)—or in multi-thread environments other threads may nullify such a single-threaded optimization. In a multi-threaded or VM (virtual machine) environment it is very hard to predict what else will be running on the same core and compete for a hardware resource, hence any static optimization may be defeated.

On the other side, the transistor processing device performance and single thread performance is saturating due to physical limits but Moore's law applies and 'silicon shrining' continuous. Thus, more and more circuits may be integrated on a chip, e.g., parallel execution units may be used to parallelize the execution of an instruction stream and thus to reduce the average cycles per instruction. The parallelism is limited to the dependencies between instructions, i.e., the result of one instruction may be needed by a following dependent instruction (s) and hence instructions cannot be arbitrarily parallelized. In order to maximize performance, the results from individual execution units need to be forwarded to other execution units. For processor designers, this may result in wiring headaches or additional cycle delay(s) on the forwarding paths. Currently, available wire stacks may limit the number of interconnected units—and thus the performance increase—and may create a significant engineering effort to close the integration gap. More metal layers in the processor design are very expensive if they are available at all.

SUMMARY

According to one aspect of the present invention, a processor with multiple execution units for instruction processing, an instruction decode and issue logic for assigning instructions for execution to one of the execution units may be provided. The processor may include control logic for resolving register access conflicts between subsequent instructions and a dependency cache. The dependency cache may include a receiving logic for receiving from the control logic having an execution unit indicator indicative of the execution unit the instruction may be planned to be executed on, storing logic responsive to the receiving logic for storing the received execution unit indicator, and retrieving logic responsive to a request from the instruction decoder and issue logic for providing the stored execution unit indicator for an instruction. The instruction decode and issue logic may be adapted for requesting execution unit indicator for an instruction from the dependency cache and to assign the instruction to one respective of the execution units dependent on the execution unit indicator received from the dependency cache.

According to another aspect of the present invention, a method for instruction processing with a processor may be provided. The processor may include an instruction decode and issue logic for assigning instructions for execution to one of the execution units. The method may include resolving register access conflicts between subsequent instructions by a control logic and providing a dependency cache. Furthermore, the method may include receiving from the control logic at the dependency cache an execution unit indicator indicative of the execution unit the instruction is planned to be executed on, storing the received execution unit indicator in the dependency cache, and requesting the execution unit indicator for an instruction from the dependency cache by the instruction decode and issue logic. After the request, the method may include retrieving the stored execution unit indicator for an instruction from the dependency cache, and assigning the instruction to one respective of the execution units dependent on the execution unit indicator received from the dependency cache.

According to a further another aspect of the present invention a related design structure, tangible embodied in a machine-readable storage medium used in a design process of a processor with multiple execution units for instruction processing, an instruction decode and issue logic for assigning instructions for execution to one of the execution units, may be provided.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
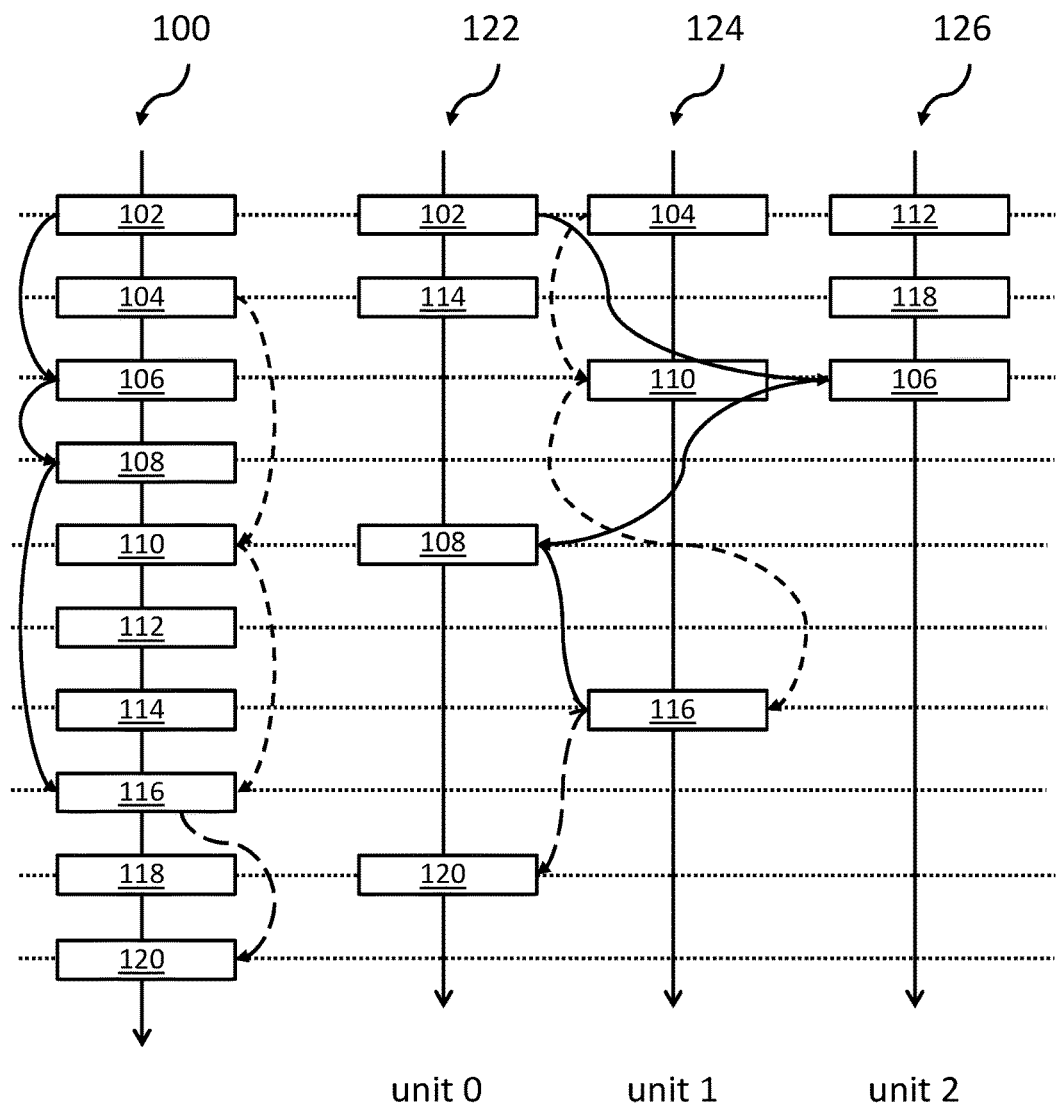

Embodiments of the invention will be described, by way of example only, and with reference to the following drawings:

FIG. 1 shows an instruction stream together with a basic, traditional round-robin instruction execution on different execution units.

Figure 2:
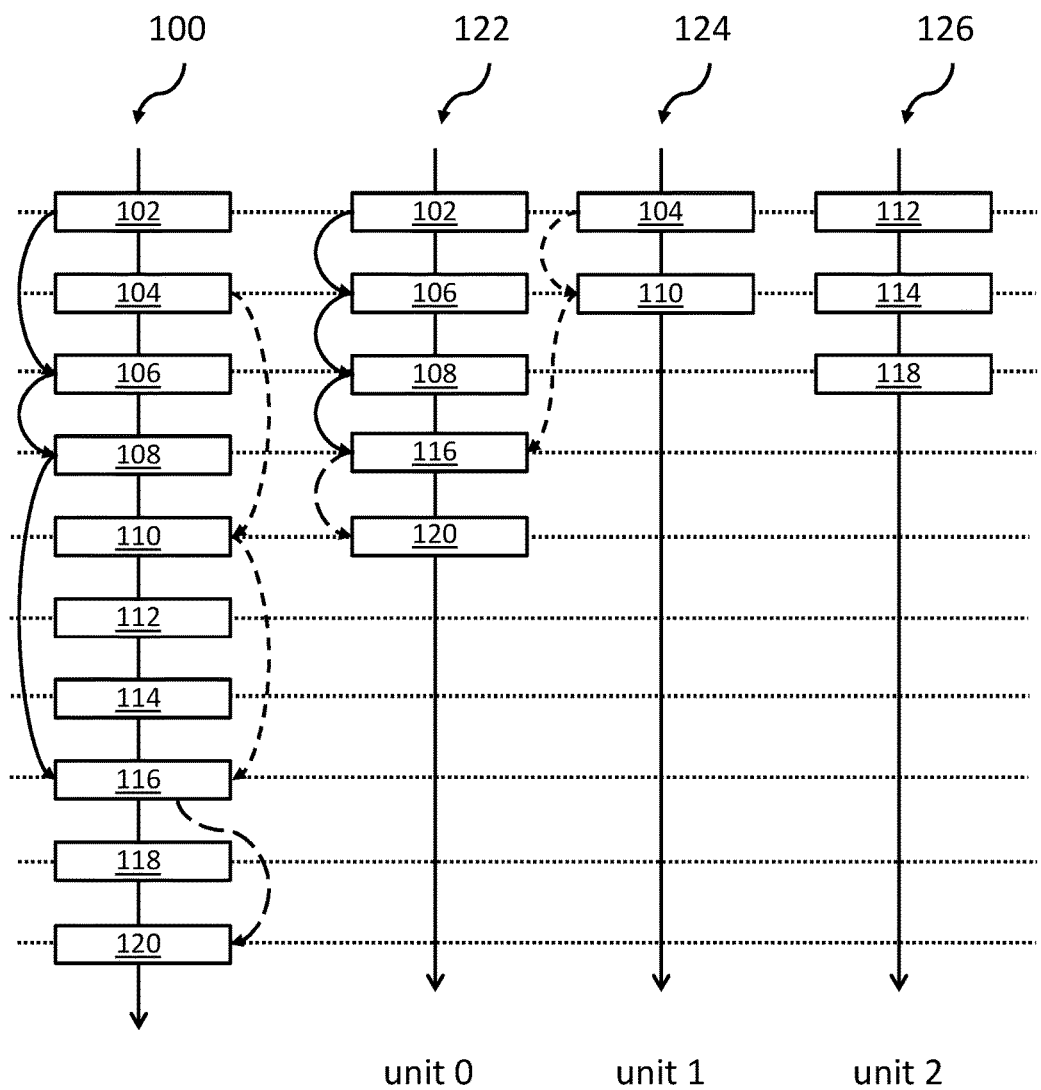

FIG. 2 shows the same instruction stream together with an optimized issuing of the same instructions to the execution units unit 0, unit 1 and unit 2.

Figure 3:
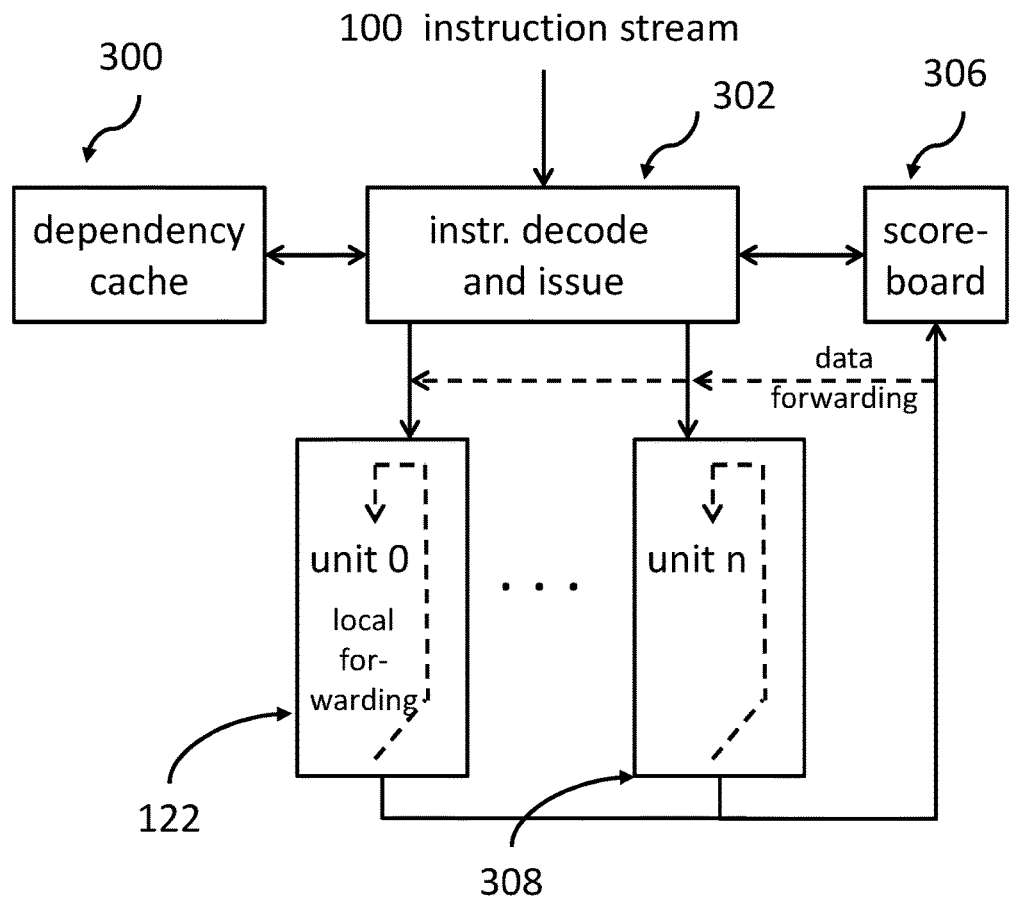

FIG. 3 shows an overview of the inventive architecture including the dependency cache.

Figure 4:
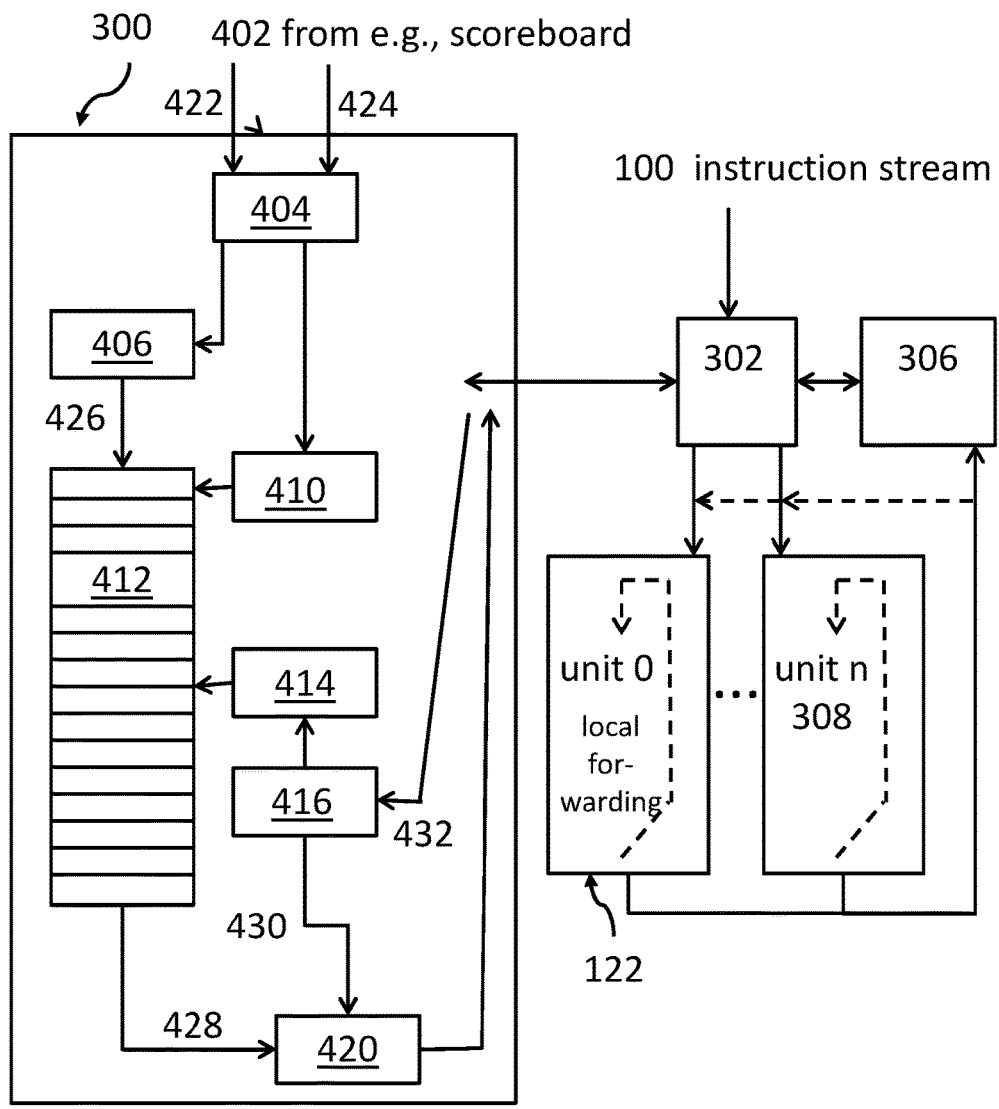

FIG. 4 shows an expanded version of a first implementation of the dependency cache in the context of the other processor components of FIG. 3.

Figure 5:
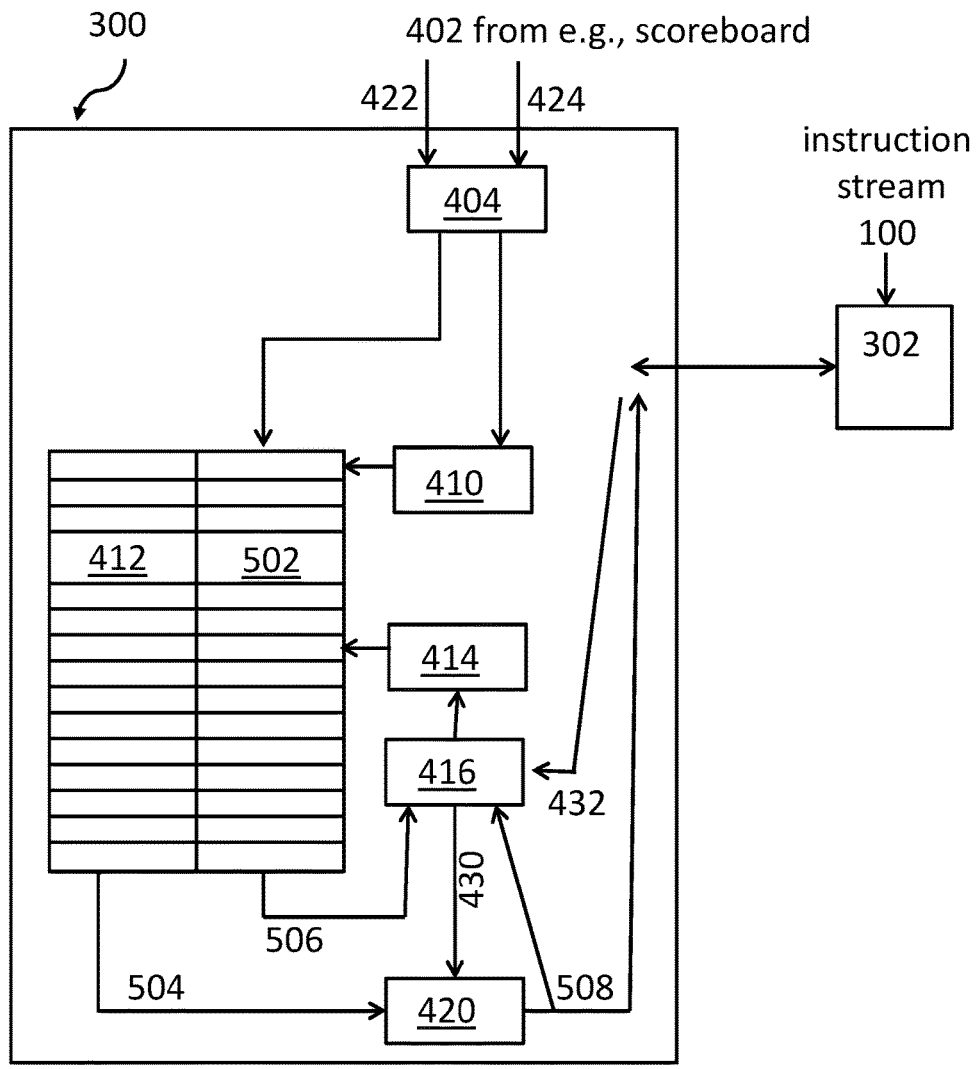

FIG. 5 shows an alternative implementation of the dependency cache.

Figure 6:
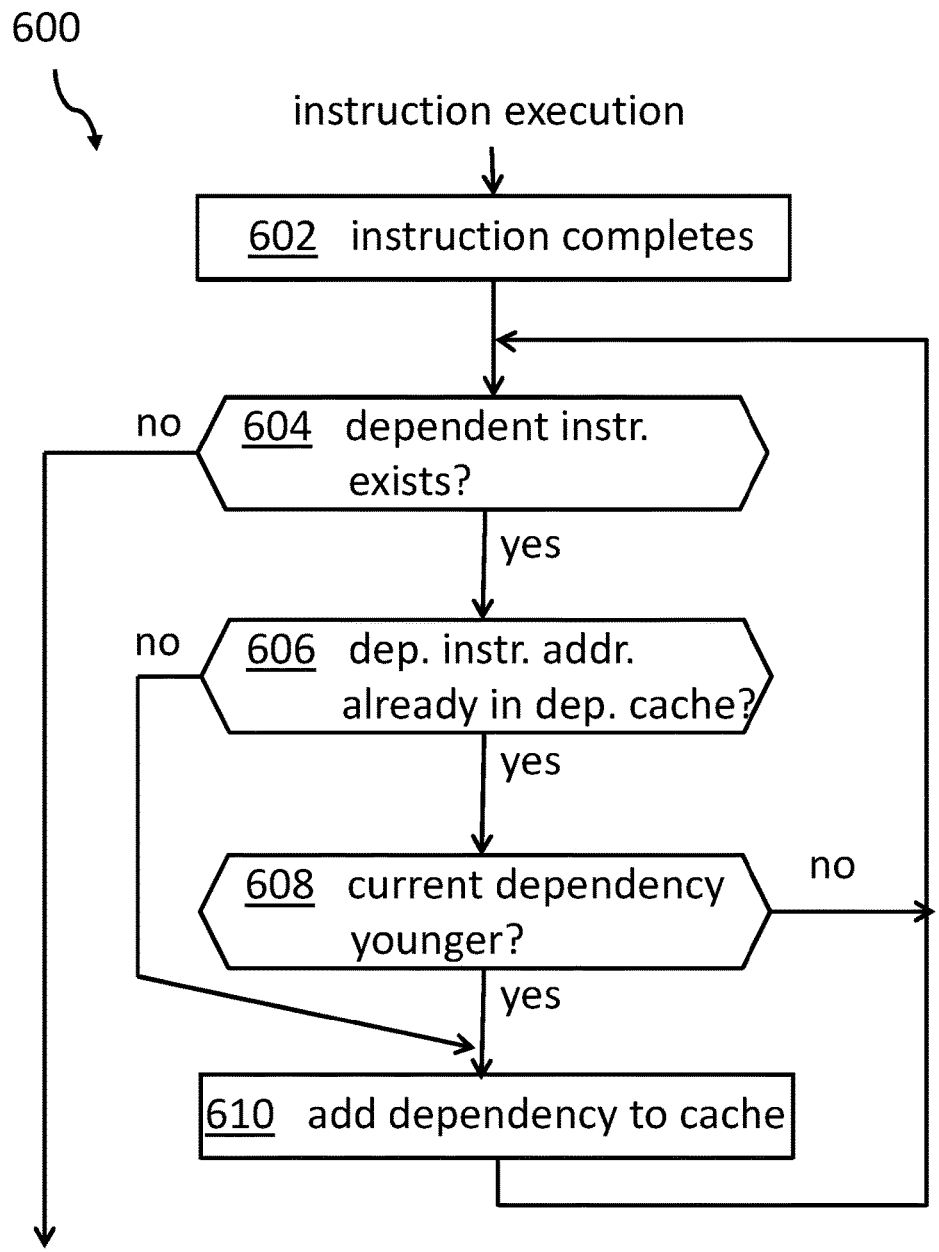

FIG. 6 shows the proposed concept in form of a flowchart for the dependency cache update.

Figure 7:
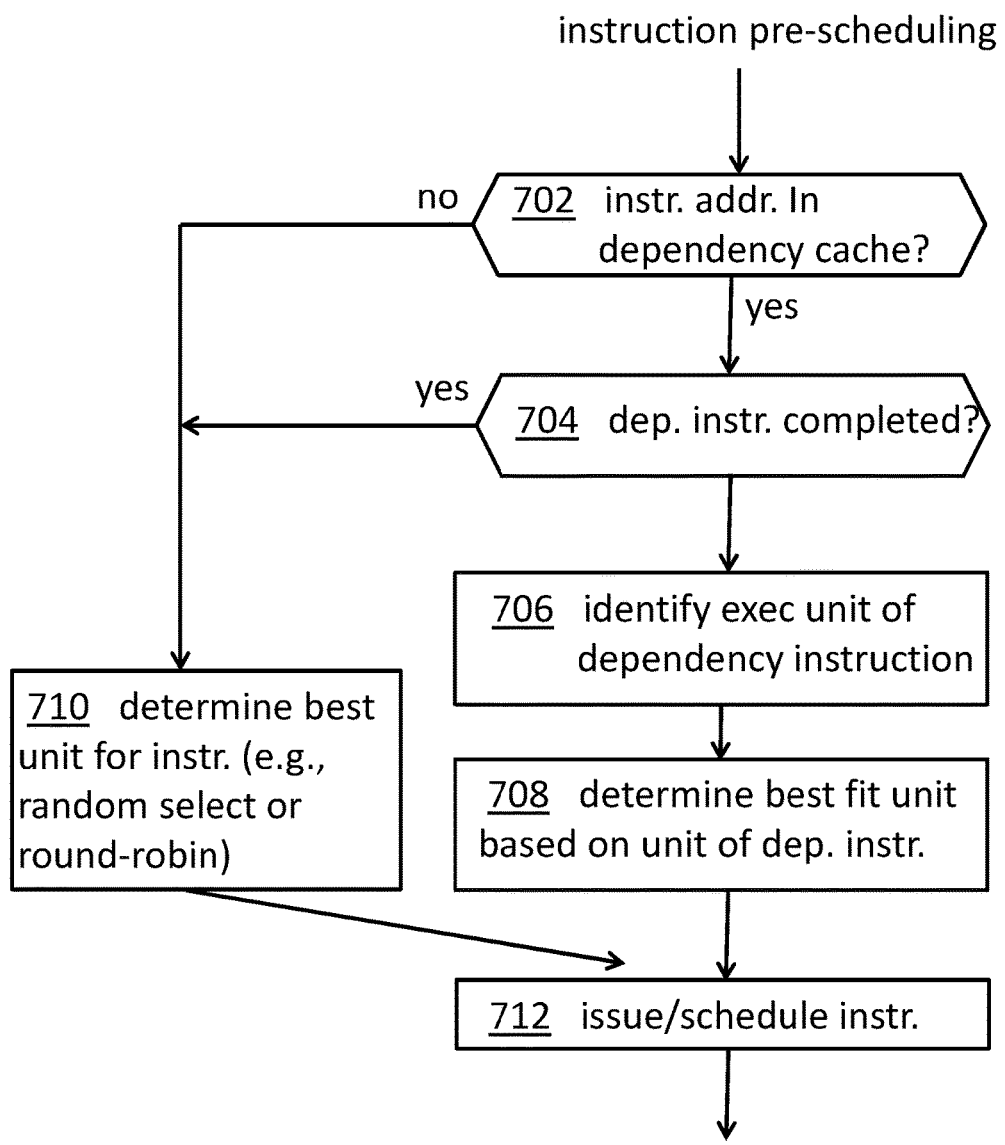

FIG. 7 shows a flowchart of a dependency aware scheduling of instructions.

DETAILED DESCRIPTION

In the context of this description, the following conventions, terms and/or expressions may be used:

The term 'processor' may denote a CPU (central processing units) having implemented a plurality of processing units to create a form of parallelism called instruction-level parallelism within a single processor, e.g., a super-scaler processor. It therefore may allow faster average execution throughput than would otherwise be possible at a given clock rate. A processor may execute more than one instruction during a clock cycle by simultaneously dispatching multiple instructions to different functional units on the processor. Each functional unit is not a separate CPU core but an execution resource within a single CPU such as an arithmetic logic unit, a bit shifter, or a multiplier. Even if such concepts may be realized in superscalar processors, the proposed concept may also work in other types of processors.

The term 'execution units' may denote a functional unit as just described, i.e., a separate unit or part of a processor. Multiple execution units may exist within one processor, all being adapted to work in parallel. These units may or may not be identical.

The term 'instruction decode and issue logic' may denote a unit as part of a processor that may receive a command or instruction to be executed. On receiving the instruction, the instruction decode and issue logic may then decode the instruction into its components—e.g., instruction itself, data and/or addresses or other parameters—and may then issue the command or parts thereof to related execution units within the processor.

The term 'control logic' may denote logic for ensuring that no conflicts may happen between parallel available executions units within the processor. The control logic may be implemented as scoreboard logic.

The term 'register access conflict' may occur in a processor comprising several processing units. Individual instructions in a stream of instruction may not be independent from each other. An instruction A—positioned later in an instruction stream—may be dependent on another instruction B. Thus, B may have to be finished before A may be executed. Thus, they need to be executed in the order of the incoming instructions stream. However, other instruction be executed in a reverse order if compared to the incoming instruction stream because they are completely independent from each other. I.e., they may be executed "out-of-order". Hence, there needs to be a mechanism in a processor allowing such a determination. A control logic as defined in the paragraph before may take over such a determination.

The term 'dependency cache' may denote a novel element as part of a processor, in particular the processor—instrumental for optimizing an issuing of instructions or parts thereof to different available processing units in order to achieve a performance gain as compared with traditional technologies.

The term 'storing logic' may denote in the context of this application a storage location—in particular as part of the dependency cache for storing an indicator identifying an execution logic a given instruction has been executed on. This way the execution unit on which a specific instruction has been executed on may be retrieved again in order to ensure that dependent instructions on the already executed one may also be executed on the same or a defined other execution unit.

The term 'retrieving logic' may describe just that logic, namely to retrieve the execution unit an instruction has been executed on in order to optimize the flow of instruction through the processor. This way, a switch of execution units from one instruction to a subsequent instruction, the instruction being dependent on each other, may be avoided. This may save valuable processing time and may increase performance.

The term 'dependency cache' may denote a logic instrumental for several tasks. The implementation details of the dependency logic may be found below as part of the description of the figures. However, one of the functionalities of the dependency cache is to store an indicator an instruction as part of an instruction stream, is executed on in an environment with several identical or diverse execution units. The execution units may, e.g., be fixed point execution units, floating point execution units or any other special execution units which may be implemented more than only once as part of a processor or two different units capable of executing the same instruction.

The proposed processor with multiple execution units with the instruction decode and issue logic for assigning instructions for execution to one of the execution units may offer a couple of advantages and technical effects:

Using the dependency cache may allow a significant performance improvement over traditional instruction issuing technologies in a processor environment. The processor may be enabled to learn static and dynamic instruction dependencies while executing a stream of instructions, i.e., when executing existing unmodified software code. The learnings may be saved on the side and may be reused at a later point in time if an equal dependency occurs again. Thus, when the code is executed again—e.g., in program loops—the dependent instructions may be issued again to the same or a close by execution unit in order to reduce forwarding latency from one execution unit to another execution unit—eventually, geometrically far away execution units—in order to increase overall performance of the processor.

According to a one embodiment of the processor, the control logic may be a scoreboard control logic. This may be instrumental in keeping track of dependent instructions in a multi-processing unit environment and support out-of-order scheduling and issuing of instructions.

According to one embodiment of the processor, the storing logic of the dependency cache may also be adapted for storing an indicator for instructions dependent on the planned instruction. This way, it may be retrievable in computing loops if instructions may be dependent again and again. The scheduling to specific processing units may be performed in an optimized way.

According to a one embodiment of the processor, dependent instructions of the instruction may be recognized at execution completion time of an instruction. Thus, next instructions may be issued or scheduled to related processing units according to the recognition. Therefore, according to a further embodiment of the processor, the dependency cache may be adapted for tracking the recognized instruction dependencies.

According to one embodiment of the processor, the dependency cache may comprise a unit select module for selecting a best execution unit or, processor core, or processor slice or, processor pipeline such that a program execution time may be reduced; i.e., by reducing the number of cycles required to finish a set of dependent instructions, thereby optimizing the parallelism of the processor.

According to an additional embodiment of the processor, addresses of entries in the dependency cache may be determined by a first mapping unit. This may also be performed by a first hashing unit for the purpose of for writing the unit indicators into the storing logic.

Correspondingly, and according to another allowed embodiment of the processor, addresses of entries in the dependency cache are determined by a second mapping unit for reading the indicator of the processing unit out of the storing logic. Also this second mapping unit may be implemented as a hashing unit for a fast access to a dependency cache table for storing the indicators of the processing units.

According to one optional embodiment of the design structure, the design structure may comprise a net-list which describes the processor. This net-list may be required for automatic production systems for the memory cell arrangement of SRAM cells.

According to another optional embodiment of the design structure, the design structure comprises at least one set of test data, characterization data, verification data, or design specification.

In the following, a detailed description of the figures will be given. All instructions in the figures are schematic. Firstly, a block diagram of an existing scheduling and issuing method will be described its effects to an embodiment of the inventive processor with multiple execution units for instruction processing. Afterwards, further embodiments as well as embodiments of the method for instruction processing with a processor will be described.

FIG. 1 shows an instruction stream 100 together with a basic, traditional round-robin instruction execution on different execution units. The stream of instructions 100 comprises a plurality of instructions 102, . . . , 120. Multiple dependencies are shown as arrows. E.g., instruction 106 is dependent on instruction 102, instruction 108 is dependent on instruction 106, instruction 116 is dependent on instruction 108; on the other side, instruction 110 is dependent on instruction 104 and instruction 116 is dependent on instruction 110. Thus, instruction 116 is dependent on both, instruction 108 and instruction 110. Instruction 120 is dependent on instruction 116. Hence, different instruction dependencies are present in the exemplary instruction stream 100.

These dependencies are also shown by a different sorts of solid and dashed lines for the execution units execution unit 0 122, execution unit 1, 124, and execution unit 2 126. As can be seen, that the 10 instructions 102, . . . , 120 may be executed in 9 cycles: instruction 120 is shown to be executed in unit 0, 122, at the same level as instruction 118 of the originally linear instruction stream 100. Thus, a performance gain is reached in the traditional architecture; however, dependencies between different execution units 0, 1, 2 exist such that results of one execution unit need to be transferred from one execution unit to another. Thus, there is room for improvement if execution units and dependencies of instructions would be aligned.

FIG. 2 shows the same instruction stream 100 together with an optimized issuing of the same instructions to the execution units unit 0, 122, unit 1, 124, unit 2, 126, according to the inventive concept. As can be seen, the dependent instructions 102, 106, 108, 116, 120 are executed on execution unit 0, 122. These instructions are executed one after the other, one cycle after the other. In parallel, and starting as early as possible, the second partial stream of dependent instructions 104 and 110 are executed on execution unit 1, 124. Only at the point when a result of execution unit 1, 124 is required in a combination with a different partial stream of dependent instructions—here, executed on execution unit 0, 122—the result of one partial execution stream has to be transferred from one execution unit to another one: in particular, from unit 1 to unit 0.

The remaining instructions 112, 114, 118, having no dependencies and may be executed independently of the other partially dependent instructions on execution unit 2, 126 in an out-of-order fashion.

As a result, the 10 instructions 102, . . . , 120 of the instruction stream 100 may have finished execution after five processor cycles instead of 9 under a traditional scheduling technique. This marks a clear performance advantage compared to traditional instruction dispatching of algorithms.

FIG. 3 shows an overview of the inventive architecture including the dependency cache. A processor may comprise a plurality of execution units 0 to n, i.e., 122 to 308. These execution units may comprise the execution units 0, 1 and 2 of FIG. 1 and FIG. 2. An instruction stream, like the instruction stream 100 from FIG. 1 and FIG. 2, may enter an instruction decode and issue unit 302 together with a control unit 306 which may be implemented in form of a scoreboard logic. Both, the scoreboard logic 306 and the dependency cache 300 interoperate with the decode and issue unit 302.

FIG. 4 shows an expanded version of the dependency cache 300 in the context of the other processor components of FIG. 3. A dependency finish logic 404 may receive, 402, at least 2 input values from the scoreboard 306: an address or unit number 422 and an address and/or the type of instruction dependent from finishing/retiring operations. It may be noted that the terms instructions and operations may be used as exchangeable terms in the context of this document.

In order to best describe the functionality of the dependency cache, a typical sequence of steps may be discussed in the following: the instruction address of the instruction to be issued from the instruction decode an issue unit 302 is used to access the dependency cache 300 to find out where to issue the instruction to, i.e., to which execution unit. For this, the instruction decode an issue unit 302 sends, 432, the address of the instruction to be issued via the dependency issue control logic 416 to a second mapping unit 414—which may be implemented as a hashing unit—to read the address of the execution unit were the instruction should be executed from the dependency cache table 412. The hashing/mapping unit 414 may be used to narrow the address to access the dependency cache table 412.

Next, the dependency cache 300 returns, 428, an execution unit identifier from the dependency cache table 412 via a unit select module 420 back to the instruction decode and issue logic 302. The dependency issue control logic 416 influences, 430, the unit select module 420 using the type of instruction to be issued as parameter.

When an instruction finishes, all instructions waiting for the results of the just finished instruction—meaning dependent operations of dependent instructions—as flagged by the scoreboard may be considered. For each of these instructions, the dependent instructions address 424—coming from the scoreboard—is used to access—via the dependent finish control logic 404—the dependency cache 300, in particular the dependency cache table 412, via the unit mapping module 406 and the first mapping unit 410, which may be implemented as a hashing module. The unit mapping module 406 may target a close by execution unit for all dependent instructions of the computer instruction, 426. In this context, the term "close" may mean geometrically close on the processor chip in order to guarantee short wirings—and thus short latency—from one execution unit to another.

Based on the instruction type of the dependent instructions, the closest unit to the finished instruction is selected to update the dependency cache 300, in particular dependency cache table 412 entry for the dependent operation. It may be noted that for a processor chip with equal processing or execution units, the execution unit where the dependent instructions started matches the execution unit where the instructions finished.

FIG. 5 shows an alternative or enhanced implementation of the dependency cache 300. The unit or module dependency finish control logic 404, the first mapping unit 410, the second mapping unit 414, the dependency issue control logic, and the unit mapping module 420 works basically in the same way as explained in the context of FIG. 4. E.g., the unit mapping module 420 sends, 508, the execution unit number or identifier of the execution unit to be used for the instruction (received, 504, from the dependency cache table 412) to be issued back to the instruction decode an issue logic 302. It may be noted that from the other known processor units as discussed in the context of FIG. 4, only the instruction decode and issue unit 302 is shown in FIG. 5, although all other units are also available in this enhanced implementation of the inventive concept.

However, the dependency cache table 412 may have a parallel entry to an execution unit identifier for an instruction that has been issued. The second, parallel column 502 is used for addresses of a youngest dependent instruction. The address of the youngest dependency 506 is used as additional input for the dependency issue control logic 416. It may also be noted that the output of the unit mapping module 420 as a feedback loop to the dependent issue control logic 460.

In this embodiment, the instruction address of the instruction to be issued from the instruction decode, an issue logic 302 is used to access the dependency cache 300 for finding out the previous dependent instructions. This is again performed via the dependent issue control logic 416 and the second mapping unit 414. The same mapping/hashing algorithms as before may be used to transform the instruction address into a narrow address to access the dependency cache table 412, 502.

Using, 506, the address of the youngest dependent instructions, the instruction address of the previous dependent instruction is used to access the dependency cache table 412, 502 again to read out the unit were the dependent instruction was issued to. It may be noted, that the dependency cache table 412, 502 may, e.g., be 20 bits wide. However, the number of bits may be processor architecture dependent.

The dependency cache table 412, 502 may then return the execution unit identifier to issue the instruction via the unit mapping module 420. There may be a valid bit with every entry in the dependency cache table 420, 502. If this valid bit is set, the unit mapping module 420 may select a unit with, e.g., a random/round-robin unit algorithm. Due to an aliasing, the selected execution unit may not be able to execute a instruction of a specific type. However, the same may happen if the valid bit may not be set.

Then, a write access may be executed using the unit mapping module 420, the dependency issue control logic 416 and the second mapping unit 414 to update the entry for the instruction to issue address in the dependency cache table 412 with the execution unit identifier where the instruction will be issued to.

When the instruction finishes in this embodiment, all instructions waiting for that result, i.e., dependent instructions—as flagged by the scoreboard—are considered (compare above). For each of these instructions, the dependent instruction address is used to access the dependency cache via the dependency finish control logic 404 and the first mapping unit 410, as discussed above, similar to the way of an instruction to be issued. In this case, the instruction address of the finishing instruction may be written via the first mapping unit to the column 512 of the dependency cache table 412, 502.

FIG. 6 shows the proposed concept in form of a flowchart 600 for the dependency cache update. The flow starts with an end of an instruction execution, 602 ("instruction completes!). Then it may be determined, 604, whether a dependent instructions exist. In case of "no", no update may be performed. In case of "yes", it is determined, 606, whether the dependent instruction address may already be in the dependent cache table 412. In case of "yes", it may be determined, 608, whether the current dependency is younger. In case of "no", the process returns back to the determination 604 whether a dependent instruction exists. In case of "yes", the dependency is added to the dependency cache table 412. In case of "no" of the determination 606 whether the dependent instructions are already in the dependency cache, the process goes straight to the step 610 were the dependency is added to the dependency cache table 412. After this, the process returns to the determination 604 whether a dependent instructions exists.

FIG. 7 shows a flowchart of a dependency aware scheduling of instructions. Coming from an instruction pre-scheduling, a determination 702 may be performed whether the instruction address is in the dependency cache 300, in particular the dependency cache table 412. In case of "yes", it may be determined, 704, whether the dependent instruction has already been completed. In case of "no", the execution unit of the dependent instruction may be identified, 706. Next, a best fit execution unit based on the unit of the dependent instruction, may be determined, 708. This may be based on minimizing the number of execution unit changes from instruction to instruction, a reuse of content in registers, a geometric distance between execution units, etc. Finally, the instruction may be issued and/or scheduled, 712.

In case of "no" of the determination 702 and in case of "yes" of the determination 704, the process continues to a determination 710 for determining a best execution unit for the current instruction. This may be performed, e.g., using a random select or round-robin algorithm. After this determination, the process continues with scheduling/issuing, 712, the instruction.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for instruction processing with a processor, the processor comprising an instruction decode and issue logic for assigning instructions for execution to one of a plurality of execution units, the method comprising:
   resolving register access conflicts between subsequent instructions by a control logic;
   providing a dependency cache, wherein the dependency cache is adapted for tracking recognized instruction dependencies;
   receiving from the control logic at the dependency cache an execution unit indicator indicative of an execution unit that a first instruction is planned to be executed on;
   storing the received execution unit indicator in the dependency cache;
   requesting the execution unit indicator for the first instruction from the dependency cache by the instruction decode and issue logic;
   retrieving the stored execution unit indicator for the first instruction from the dependency cache;
   assigning the first instruction to one respective execution unit of the plurality of execution units dependent on the execution unit indicator received from the dependency cache, wherein a dependent instruction depends on the first instruction that has been assigned; and
   assigning the dependent instruction to an execution unit based on the stored execution unit indicator for the first instruction that the dependent instruction is dependent upon;
   wherein, at execution completion time of an instruction, dependent instructions of the executed instruction are recognized, and addresses of the dependent instructions are provided by a scoreboard control logic.

2. The method according to claim 1, also comprising storing an indicator for instructions dependent on a planned instruction.

3. The method according to claim 1, also comprising recognizing dependent instructions of the first instruction at execution completion time of an instruction.

4. The method according to claim 1, also comprising selecting a best execution unit or processor core, or processor slice, or processor pipeline such that a program execution time is reduced.

5. The method according to claim 1, also comprising determining addresses of entries in the dependency cache by a first mapping unit for writing into the storing logic.

6. The method according to claim 1, also comprising determining addresses of entries in the dependency cache by a second mapping unit for reading out of the storing logic.

* * * * *